Dec. 26, 1933. M. W. C. REINER 1,941,226
DISPENSING RECEPTACLE
Filed Oct. 14, 1932
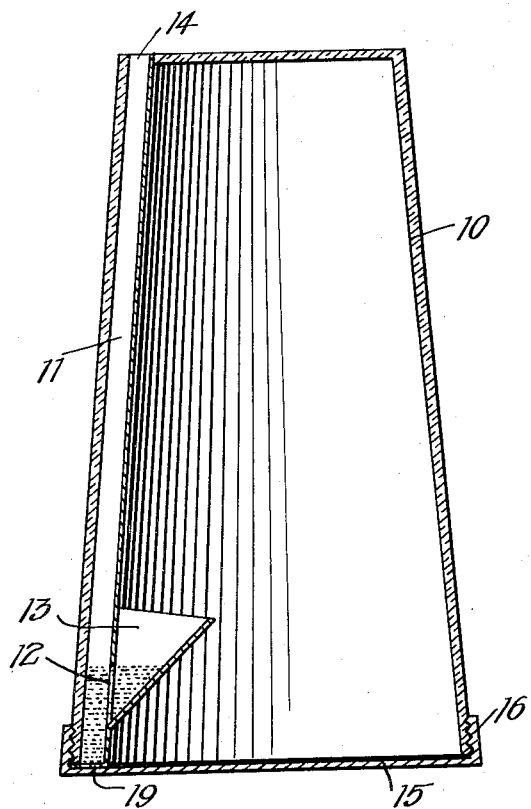
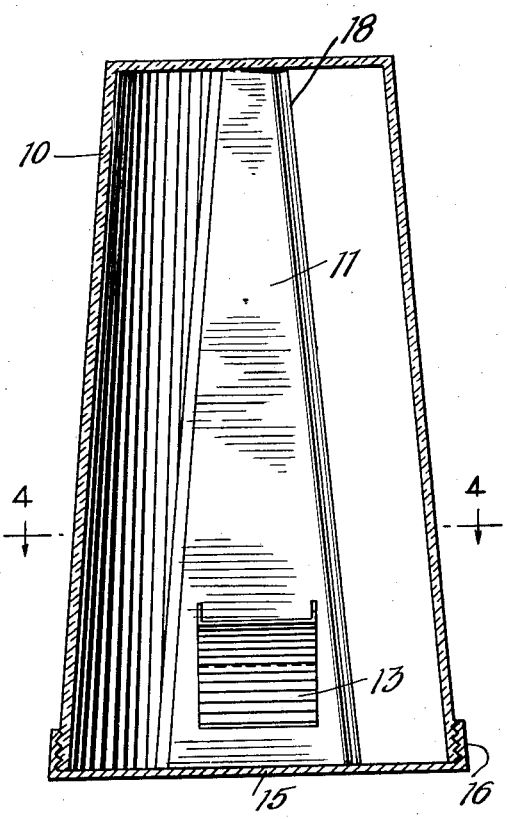
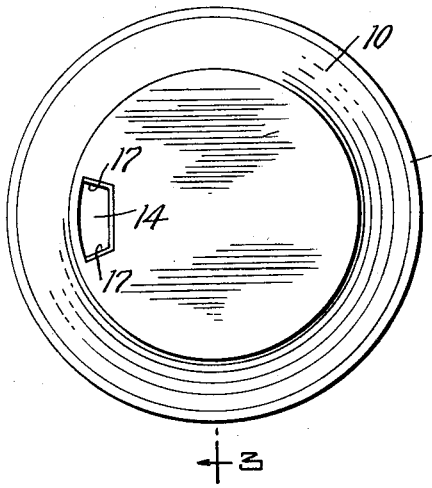
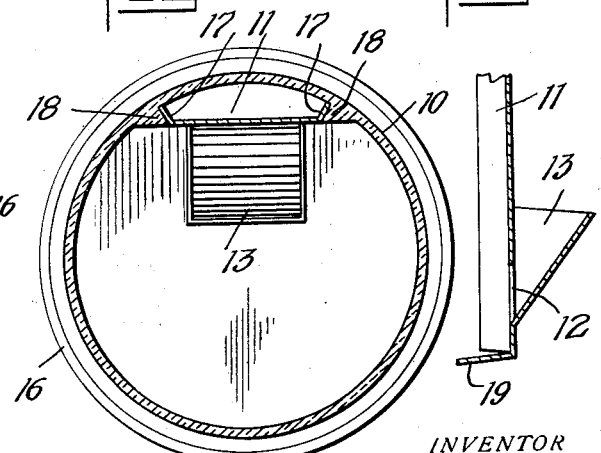
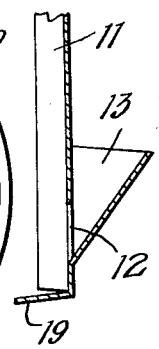
INVENTOR
Maxwell W. Charles Reiner
BY
ATTORNEY Patented Dec. 26, 1933

1,941,226

UNITED STATES PATENT OFFICE 1,941,226

DISPENSING RECEPTACLE

Maxwell W. Charles Reiner, Bronx, N. Y., assignor to Harry M. Reiner, New York, N. Y.

Application October 14, 1932. Serial No. 637,766

3 Claims. (Cl. 221—98)

This invention relates to dispensing receptacles, and more particularly to the turn-over type of dispenser.

Among the principal objects which the present invention has in view are: To provide an improved receptacle which will dispense contents thereof in measured quantities; to provide means to accurately measure the contents to be dispensed; to provide means which will securely hold the dispensing means in place within the receptacle; to provide an opening in the receptacle to register with the upper part of the dispensing means; to secure simplicity of construction and operation; and to obtain other advantages and results as may be brought out in the following description.

In the drawing:

Figure 1 is a vertical sectional view of a dispensing receptacle embodying my invention;

Figure 2 is a top plan;

Figure 3 is a vertical sectional view taken on the line 3—3 of Figure 2;

Figure 4 is a cross sectional view taken on line 4—4 of Figure 3; and

Figure 5 is a fragmentary sectional view of the dispensing means.

As seen in the drawing, the reference numeral 10 indicates a receptacle constructed preferably of glass or other like material, one part thereof being here shown as wider in diameter and tapering towards its other end to a lesser diameter. For clarity, it is preferable that the lower or wider part be designated as the base, and the other end designated as the top. It is to be understood that when a required amount or measured quantity of contents such as sugar or other condiment is to be dispensed, the receptacle may then be inverted and held in such inverted condition until the measured quantity has been fully released, after which the receptacle is returned to its upright position, and another supply of the contents will then be permitted to be measured.

In carrying out the invention and for measuring a quantity of the contents to be dispensed, there is provided an elongated member or chute 11 extending from the bottom or base of the receptacle 10 and extending upwardly to the top thereof. This chute is preferably of metal and substantially of a width and depth to utilize little space of the interior of the receptacle. Adjacent its lower end, the chute has a perforation 12 opening into a hopper 13 within the receptacle 10, said hopper opening upwardly so as to receive a quantity of sugar or other condiment and direct the same into the chute 11, while the receptacle is in its normal upright position. The perforation is spaced from the bottom of the chute so that a measured quantity of the condiment may be fed into the chute and rest therein between the bottom of the chute and the top of the perforation. When the receptacle is inverted the condiment thus carried in the lower part of the chute will slide down the chute and out of the discharge opening 14 provided in the end of the receptacle which is normally the top.

It will be observed that in use, inversion of the receptacle 10 to discharge the quantity of condiment resting in the chute 11 will also cause the condiment within the hopper 13 to discharge out of the larger end of the hopper back into the receptacle, and the sloping wall of the hopper will prevent any pressure from the condiment in the receptacle ejecting any excess of condiment into the chute during the inversion operation.

The end of the receptacle which is normally at the bottom thereof is preferably made removable, thereby providing a filling closure 15. This closure may conveniently have a threaded flange 16 adapted to be screwed onto the outside wall of the receptacle. To fill the device, it will be observed that the receptacle is inverted, at which time the hopper 13 is protecting perforation 12, and as the condiment is poured into the receptacle there will be no leakage into the chute. After the filling is completed, the filling closure 15 is replaced and the device is ready for use.

It may further be noted that the particular construction and mounting for the chute are features of novelty of the present invention. The chute 11 is preferably of metal with some resiliency and tapers from a larger width at the lower end to a smaller width at the upper end. At the side edges of the main wall of the chute are provided flanges 17, 17 extending the entire length of the chute. These flanges bear against longitudinal beads 18, 18 which are spaced and taper toward each other corresponding to the shape of the chute and together forming a guideway for receiving the chute. These beads 18, 18 are preferably integrally formed with the wall of the receptacle. The resiliency of the metal of the chute permits the same to be pressed firmly into the guideway and held therein by engagement of the lower end thereof with the inside face of the filling closure 15.

The end of the chute 11 next the filling closure, as shown more especially in Figure 5, has a resilient lip 19 bent inwardly from the main wall of the chute so that it will be engaged by the filling closure 15 and pressed inwardly toward the chute when the parts are assembled, thereby applying a resilient pressure upon the chute in a direction to seat the same in its guideway. This lip also prevents the condiment from being introduced directly into the chute when the receptacle is being filled.

When desired to wash the device, the chute is readily removable from the guideway, particularly so in view of the tapering shape of chute and guideway. The hopper 13 and chute 11 are preferably permanently attached to each other so that handling and reassembly are simplified.

I claim:

1. A dispensing device comprising a receptacle having a discharge opening in one of its walls and a chute cooperating with another wall of the receptacle to form a channel leading to the discharge opening, means integral with said other wall, said means slidably holding the chute therein against transverse movement, said chute having an opening remote from said discharge opening for establishing communication between the interior of the receptacle and the channel, a removable filling closure at the end of the receptacle remote from said discharge opening, and means at the end of the chute next the filling closure engaged by said closure when in locked position seating the chute toward the first mentioned wall and cooperating with said first mentioned means whereby a pressure is exerted for retaining the chute positioned in the receptacle.

2. A dispensing device comprising a receptacle having a discharge opening in one of its walls and a chute cooperating with another wall of the receptacle to form a channel leading to the discharge opening, means integral with said other wall, said means slidably holding the chute therein against transverse movement, said chute having an opening remote from said discharge opening for establishing communication between the interior of the receptacle and the channel, a removable filling closure at the end of the receptacle remote from said discharge opening, and a resilient lip at the end of the chute next the filling closure engaged by said closure when in locked position seating the chute toward the first mentioned wall and cooperating with said means whereby a resilient pressure is exerted for retaining the chute positioned in the receptacle.

3. A dispensing device comprising a receptacle having a discharge opening in one of its walls and a tapered chute cooperating with another wall of the receptacle to form a converging channel leading to the discharge opening, a pair of longitudinal beads integral with said other wall for slidably holding the chute therein against transverse movement, said chute having an opening remote from said discharge opening for establishing communication between the interior of the receptacle and the channel, a removable filling closure at the end of the receptacle remote from said discharge opening and next the larger end of the chute, and a resilient lip the width of said larger end of the chute next the filling closure engaged by said closure when in locked position seating the chute toward the first mentioned wall and cooperating with said beads whereby a resilient pressure is exerted for retaining the chute positioned in the receptacle.

MAXWELL W. CHARLES REINER.